US012187983B2

(12) United States Patent
Hodge et al.

(10) Patent No.: US 12,187,983 B2
(45) **Date of Patent: *Jan. 7, 2025**

(54) HARD SURFACE CLEANING COMPOSITIONS

(71) Applicant: ECOLAB USA INC., Saint Paul, MN (US)

(72) Inventors: Charles Allen Hodge, Saint Paul, MN (US); Mark Levitt, Saint Paul, MN (US); Amanda Ruth Blattner, Saint Paul, MN (US); Victor Fuk-Pong Man, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 451 days.

This patent is subject to a terminal disclaimer.

(21) Appl. No.: 17/646,531

(22) Filed: Dec. 30, 2021

(65) Prior Publication Data

US 2022/0119736 A1 Apr. 21, 2022

Related U.S. Application Data

(63) Continuation of application No. 16/948,470, filed on Sep. 21, 2020, now Pat. No. 11,254,897, which is a (Continued)

(51) Int. Cl.

| | |
|---|---|
| ***C11D 1/72*** | (2006.01) |
| ***B08B 3/04*** | (2006.01) |

(Continued)

(52) U.S. Cl.

CPC .............. *C11D 1/8255* (2013.01); *C11D 1/66* (2013.01); *C11D 1/662* (2013.01); *C11D 3/2068* (2013.01);

(Continued)

(58) Field of Classification Search

CPC ........... C11D 1/662; C11D 1/72; C11D 1/825; C11D 3/044; C11D 3/10; C11D 3/2065; C11D 3/22; B08B 3/04

See application file for complete search history.

(56) References Cited

U.S. PATENT DOCUMENTS

| | | | |
|---|---|---|---|
| 2,674,619 | A | 4/1954 | Lundsted |
| 2,903,486 | A | 9/1959 | Brown |

(Continued)

FOREIGN PATENT DOCUMENTS

| | | | |
|---|---|---|---|
| WO | 0035283 | A1 | 6/2000 |
| WO | 0059696 | A2 | 10/2000 |
| WO | 2008049616 | A1 | 5/2008 |

OTHER PUBLICATIONS

Air Products, "Industrial and Institutional Cleaning", Formulary 2010, brochure, 56 pages, Jan. 1, 2010.

(Continued)

*Primary Examiner* — Brian P Mruk

(74) *Attorney, Agent, or Firm* — McKee, Voorhees & Sease, PLC

(57) ABSTRACT

Cleaning compositions that include a non-functionalized alkyl polyglycoside, a nonionic surfactant system, and water. In certain embodiments, the cleaning compositions are substantially free of alkyl phenol ethoxylates. Additionally, some embodiments of the invention are substantially free of butyl cellosolve. The cleaning composition is capable of removing both proteinaceous food soils and hydrocarbon-based oily soils. The cleaning compositions include a biorenewable, environmentally friendly alternative to nonyl phenol ethoxylates and exhibit superior cleaning of food soils.

18 Claims, 4 Drawing Sheets

Related U.S. Application Data continuation of application No. 16/029,080, filed on Jul. 6, 2018, now Pat. No. 10,781,400, which is a continuation of application No. 15/582,918, filed on May 1, 2017, now Pat. No. 10,041,021, which is a continuation of application No. 14/980,361, filed on Dec. 28, 2015, now Pat. No. 9,670,433.

(51) Int. Cl.

| | |
|---|---|
| ***C11D 1/66*** | (2006.01) |
| ***C11D 1/825*** | (2006.01) |
| ***C11D 3/10*** | (2006.01) |
| ***C11D 3/20*** | (2006.01) |
| ***C11D 3/22*** | (2006.01) |
| ***C11D 3/34*** | (2006.01) |
| ***C11D 3/43*** | (2006.01) |
| *C11D 3/33* | (2006.01) |

(52) U.S. Cl.

CPC .......... *C11D 3/2086* (2013.01); *C11D 3/3418* (2013.01); *C11D 3/43* (2013.01); *C11D 1/72* (2013.01); *C11D 3/33* (2013.01)

(56) References Cited

U.S. PATENT DOCUMENTS

| | | | | |
|---|---|---|---|---|
| 3,048,548 | A | 8/1962 | Martin et al. | |
| 3,334,147 | A | 8/1967 | Brunelle et al. | |
| 3,382,178 | A | 5/1968 | Lissant et al. | |
| 3,442,242 | A | 5/1969 | Campbell et al. | |
| 3,929,678 | A | 12/1975 | Heuring et al. | |
| 4,320,147 | A | 3/1982 | Schaeufele | |
| 4,565,647 | A | 1/1986 | Llenado | |
| 4,618,914 | A | 10/1986 | Sato et al. | |
| 4,830,773 | A | 5/1989 | Olson | |
| 5,003,057 | A | 3/1991 | McCurry et al. | |
| 5,330,674 | A | 7/1994 | Urfer et al. | |
| 5,389,685 | A | 2/1995 | Smith et al. | |
| 5,545,749 | A | 8/1996 | Smith et al. | |
| 5,547,990 | A | 8/1996 | Hall et al. | |
| 5,770,549 | A | 6/1998 | Gross | |
| 5,833,741 | A | 11/1998 | Walker | |
| 5,981,457 | A | 11/1999 | Ahmed | |
| 6,369,021 | B1 | 4/2002 | Man et al. | |
| 6,464,764 | B1 | 10/2002 | Lichtenberg et al. | |
| 6,583,181 | B1 | 6/2003 | Chiang et al. | |
| 6,939,840 | B2 | 9/2005 | Lichtenberg et al. | |
| 8,110,537 | B2 | 2/2012 | Gohl et al. | |
| 8,172,953 | B2 | 5/2012 | Hodge et al. | |
| 8,216,988 | B2 | 7/2012 | Hodge et al. | |
| 8,216,994 | B2 | 7/2012 | Todge et al. | |
| 8,221,733 | B2 | 7/2012 | Lichtenberg et al. | |
| 8,287,658 | B2 | 10/2012 | Miralles et al. | |
| 8,287,659 | B2 | 10/2012 | Hodge et al. | |
| 8,299,009 | B2 | 10/2012 | Hodge et al. | |
| 8,389,457 | B2 | 3/2013 | Hodge et al. | |
| 8,658,584 | B2 | 2/2014 | Hodge et al. | |
| 8,697,622 | B2 | 4/2014 | Man et al. | |
| 9,670,433 | B1 * | 6/2017 | Hodge | C11D 3/43 |
| 10,041,021 | B2 * | 8/2018 | Hodge | C11D 1/66 |
| 10,206,392 | B2 | 2/2019 | Kloeppel et al. | |
| 10,285,400 | B2 | 5/2019 | Lei et al. | |
| 10,781,400 | B2 * | 9/2020 | Hodge | C11D 3/2068 |
| 11,254,897 | B2 * | 2/2022 | Hodge | C11D 3/2086 |
| 2002/0169099 | A1 | 11/2002 | Knox | |
| 2003/0029812 | A1 | 2/2003 | Burns et al. | |
| 2003/0114342 | A1 | 6/2003 | Hall | |
| 2003/0187073 | A1 | 10/2003 | Lichtenberg et al. | |
| 2004/0077516 | A1 | 4/2004 | Man et al. | |
| 2004/0220275 | A1 | 11/2004 | Lutzeler et al. | |
| 2005/0124723 | A1 | 6/2005 | Fritschi et al. | |
| 2006/0094619 | A1 * | 5/2006 | Billman | C11D 1/825 510/284 |
| 2007/0253926 | A1 | 11/2007 | Tadrowski | |
| 2013/0023458 | A1 | 1/2013 | Hodge et al. | |
| 2013/0322710 | A1 | 12/2013 | Notte | |
| 2014/0171512 | A1 | 6/2014 | Kloeppel et al. | |
| 2014/0309155 | A1 | 10/2014 | Man | |
| 2015/0018266 | A1 | 1/2015 | Hodge | |
| 2015/0252310 | A1 | 9/2015 | Blattner | |
| 2017/0284605 | A1 | 10/2017 | Janak et al. | |
| 2020/0229435 | A1 | 7/2020 | Malet et al. | |
| 2020/0305437 | A1 | 10/2020 | McGeechan et al. | |

OTHER PUBLICATIONS

Air Products, "Tomadol Ethoxylated Alcohols", Product Guide, available at www.airproducts.com/nimble, 36 pages. Dec. 3, 2015.

Rhodia Novecare, "Rhodiasolv Iris, New Generation of Safe and Ecofriendly Solvents", Product Flyer, available at www.rhodia-novecare.com, 2 pages. Mar. 8, 2008.

Air Products, "Tomadol 901 Surfactant", Material Safety Data Sheet, available at www.airproducts.com/productstewardship/, 6 pages, Nov. 2007. Nov. 7, 2007.

Air Products, "Tomakleen G-12 Additive", Material Safety Data Sheet, available at www.airproducts.com/ productstewardship, 7 pages, Aug. 2013. Aug. 3, 2013.

Dow Chemical Company, "Versene 100 Chelating Agent", Technical Data, available at www.versene.com, 2 pages, May 2012. May 1, 2012.

Eastman Chemical Company, "Eastman Omnia High-Performance Solvent", Technical Data Sheet, 2 pages, Jun. 2014. Jun. 11, 2014.

Eastman Chemical Company, "Eastman Omnia Solvent", Safety Data Sheet, available at www.EASTMAN.com, 9 pages May 2015.

Eastman Chemical Company, Eastman Omnia High Performation Solvent, Sales Specificaiton, 1 page Jun. 2014.

Javelin Technology, "Adhesive and Gum Remover For Hard and Soft Surfaces" Technical Data Sheet, 2 pages. 2013.

Air Products, "Tomakleen G-12 Solvent Replacement Additive", Product Flyer, available at www. airproducts.com/nimble, 2 pages. Dec. 21, 2015.

* cited by examiner

HARD SURFACE CLEANING COMPOSITIONS

CROSS REFERENCE TO RELATED APPLICATIONS

This is a Continuation Application of U.S. Ser. No. 16/948,470, filed Sep. 21, 2020, now U.S. Pat. No. 11,254,897, issued Feb. 22, 2022, which is a Continuation Application of U.S. Ser. No. 16/029,080, filed July 2018, now U.S. Pat. No. 10,781,400, issued Sep. 22, 2020, which is a Continuation Application of U.S. Ser. No. 15/582,918, filed May 1, 2017, now U.S. Pat. No. 10,041,021, issued Aug. 7, 2018, which is a Continuation Application of U.S. Ser. No. 14/980,361, filed Dec. 28, 2015, now U.S. Pat. No. 9,670,433, issued Jun. 6, 2017, which are herein incorporated by reference in their entireties.

FIELD OF THE INVENTION

The present invention relates to the field of hard surface cleaning compositions. In particular, the invention relates provides efficacy against both proteinaceous food soils and hydrocarbon-based oily soils.

BACKGROUND OF THE INVENTION

Conventional detergents used in the ware washing and laundering industries, particularly those intended for institutional use, generally contain alkyl phenol ethoxylates (APEs). APEs are used in detergents as a cleanser and a degreaser for their effectiveness at removing soils containing grease from a variety of surfaces. Commonly used APEs include nonylphenol ethoxylates (NPE) surfactants.

However, while effective, APEs are disfavored due to environmental concerns. For example, NPEs are formed through the combination of ethylene oxide with nonylphenol (NP). Both NP and NPEs exhibit estrogen-like properties and may contaminate water, vegetation and marine life. NPE is also not readily biodegradable and remains in the environment or food chain for indefinite time periods. There is therefore a need in the art for an environmentally friendly and biodegradable alternative that can replace APEs in hard surface cleaners.

Butyl cellosolve (2-Butoxyethanol) has been recognized as a good solvent for incorporation in cleaning composition, particularly, hard surface cleaning compositions. It has been a central component in cleaning compositions for some time. Recently, however, it has come under some regulatory scrutiny in certain states in the United States (e.g., California), in Canada, and in Europe. As a result, there is a need for formulations that do not require butyl cellosolve but which can provide similar cleaning efficacy.

Many conventional detergents are only useful for particular soil types. Generally, soils are classified as either those associated with animal fats and food stains, which often have higher protein-based soils, or mineral oils and greases. Thus, there is a need to develop detergents that are capable of removing both types of soils with a high efficacy.

SUMMARY OF THE INVENTION

The present invention comprises a hard surface cleaning compositions suitable for cleaning against both proteinaceous food soils and hydrocarbon-based oily soils. The cleaning compositions include a non-functionalized alkyl polyglucoside, a nonionic surfactant system, and water. The cleaning compositions are preferably substantially free of alkyl phenol ethoxylates and substantially free of butyl cellosolve. The surfactant system preferably comprises a linear alcohol ethoxylate and at least one additional nonionic surfactant. Embodiments of the invention also include methods of preparing the cleaning compositions and methods of using the cleaning compositions.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive.

DETAILED DESCRIPTION OF THE PREFERRED EMBODIMENTS

Figure 1:
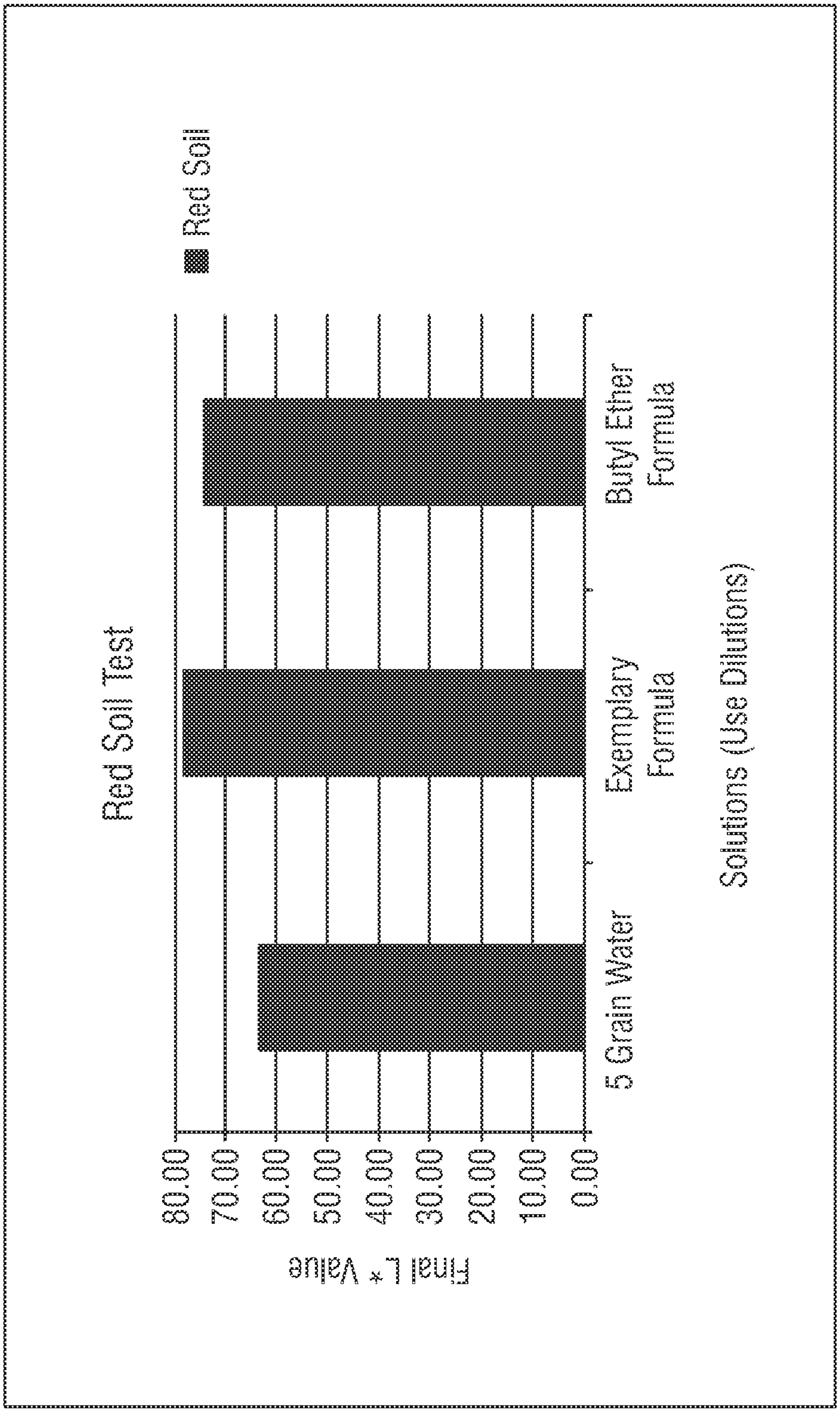
FIG. 1 is a graph showing the cleaning efficacy of an exemplary cleaning composition of the invention versus an equivalent butyl cellosolve-containing cleaning composition and a control of 5 grain water against proteinaceous food soils.

Other than in the operating examples, or where otherwise indicated, all numbers expressing quantities of ingredients or reaction conditions used herein are to be understood as being modified in all instances by the term "about".

As used herein, weight percent (wt-%), percent by weight, % by weight, and the like are synonyms that refer to the concentration of a substance as the weight of that substance divided by the total weight of the composition and multiplied by 100.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about," the claims include equivalents to the quantities.

The term "alkyl" refers to a straight or branched chain monovalent hydrocarbon radical having a specified number of carbon atoms. Alkyl groups may be unsubstituted or substituted with substituents that do not interfere with the specified function of the composition and may be substituted once or twice with the same or different group. Substituents may include alkoxy, hydroxy, mercapto, amino, alkyl substituted amino, nitro, carboxy, carbanyl, carbanyloxy, cyano, methylsulfonylamino, or halogen, for example. Examples of "alkyl" include, but are not limited to, methyl, ethyl, n-propyl, isopropyl, n-butyl, s-butyl, t-butyl, n-pentyl, n-hexyl, 3-methylpentyl, and the like.

The term "surfactant" or "surface active agent" refers to an organic chemical that when added to a liquid changes the properties of that liquid at a surface.

"Cleaning" means to perform or aid in soil removal, bleaching, microbial population reduction, rinsing, or combination thereof.

As used herein, the term "substantially free" refers to compositions completely lacking the component or having such a small amount of the component that the component does not affect the effectiveness of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein, the term "ware" includes items such as eating and cooking utensils. As used herein, the term "ware washing" refers to washing, cleaning, or rinsing ware.

As used herein, the term "hard surface" includes showers, sinks, toilets, bathtubs, countertops, windows, mirrors, transportation vehicles, floors, and the like. These surfaces can be those typified as "hard surfaces" (such as walls, floors, bed-pans)

As used herein, a solid cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to temperatures of up to about 100° F. and greater than about 120° F. A cast, pressed, or extruded "solid" may take any form including a block. When referring to a cast, pressed, or extruded solid it is meant that the hardened composition will not flow perceptibly and will substantially retain its shape under moderate stress or pressure or mere gravity, as for example, the shape of a mold when removed from the mold, the shape of an article as formed upon extrusion from an extruder, and the like. The degree of hardness of the solid cast composition can range from that of a fused solid block, which is relatively dense and hard, for example, like concrete, to a consistency characterized as being malleable and sponge-like, similar to caulking material.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "alkyl phenol ethoxylate free" or "NPE-free" refers to a composition, mixture, or ingredients that do not contain alkyl phenol ethoxylates or phenol-containing compounds or to which the same has not been added. Should alkyl phenol ethoxylates or—alkyl phenol ethoxylate containing compound be present through contamination of a composition, mixture, or ingredients, the amount of the same shall be less than 0.5 wt. %. In another embodiment, the amount of is less than 0.1 wt. % and in yet another embodiment, the amount is less than 0.01 wt. %.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a alkyl phenol ethoxylate-containing cleaning to address a typical soiling condition on a typical substrate. This degree of cleanliness may, depending on the particular cleaning product and particular substrate, correspond to a general absence of visible soils, or to some lesser degree of cleanliness, as explained in the prior paragraph.

Compositions

The present invention relates to hard surface cleaning compositions and methods of using the cleaning compositions for cleaning and removing organic and inorganic soils from a surface. In particular, the cleaning composition is effective at removing both food soil containing protein (i.e., "proteinaceous food soil(s)") and industrial hydrocarbon based oily soils (i.e., "hydrocarbon-based oily soil(s)"). In an aspect of the invention, the compositions can provide effectively remove proteinaceous food soils containing at least 10 wt. % protein, preferably at least 15 wt. % protein, more preferably at least 20 wt. % protein, and most preferably at least 25 wt. % protein. In an aspect of the invention, the compositions can provide effectively remove hydrocarbon-based oily soils containing at least 40 wt. % hydrocarbons, preferably at least 50 wt. % hydrocarbons, more preferably at least 60 wt. % hydrocarbons, and most preferably at least 65 wt. % hydrocarbons. The cleaning compositions can include a non-functionalized alkyl polyglycoside, a surfactant system, and water. In further embodiments, the compositions can contain an alkalinity source, coupling agent, dicarboxylic acid ester, solvent, stabilizing agent, water conditioning agent, or combinations thereof. Further, embodiments of the invention can be substantially free of APEs and/or butyl cellosolve.

Alkyl Polyglycoside

The composition of the invention include a non-functionalized alkyl polyglycoside (APG). Preferred APGs include alkyl polyglucosides, which are characterized by the saccharide moiety being glucose. Preferred alkyl polyglucosides are naturally derived.

The alkyl polyglycosides, which can be used in the present invention, are fatty ether derivatives of saccharides or polysaccharides which are formed when a carbohydrate is reacted under acidic condition with a fatty alcohol through condensation polymerization. The APGs commonly are derived from corn-based carbohydrates and fatty alcohols from natural oils in animals, coconuts and palm kernels. Such methods of deriving APGs are known in the art, for example, U.S. Pat. No. 5,003,057 (McCurry), and the description therein on the methods of making glycosides and chemical properties are incorporated by reference herein.

The alkyl polyglycoside that can be used in the present invention contains a hydrophilic group derived from carbohydrates and is composed of one or more anhydroglucose. Each of the glucose units can have two ether oxygens and three hydroxyl groups and a terminal hydroxyl group, imparting water solubility to the glycoside. The presence of the alkyl carbons leads to the hydrophobic activity. When carbohydrate molecules react with fatty alcohol molecules, alkyl polyglycoside molecules are formed with single or multiple anhydroglucose units, which are termed monoglycosides and polyglycosides, respectively. The final alkyl polyglycoside product typically has a distribution of varying concentration of glucose units (or degree of polymerization).

The APG used in the invention preferably comprises the saccharide or polysaccharide groups (i.e., mono-, di-, tri-, etc. saccharides) of hexose or pentose, and a fatty aliphatic group with 6 to 20 carbon atoms. Alkyl polyglycosides which can be used in the present invention are represented by the general formula of $$(G)_{x-O-R}$$

where G is a moiety derived from a reducing saccharide containing 5 or 6 carbon atoms, e.g., pentose or hexose; R is fatty aliphatic group containing 6 to 20 carbon atoms; and x is the degree of polymerization (D.P.) of the polyglycoside, representing the number of monosaccharide repeating units in the polyglycoside. Generally, x is an integer on the basis of individual molecules, but because there are statistical variations in the manufacturing process of the APG, x may be a noninteger on an average basis when referred to APG used as an ingredient for the hard surface cleaner of the present invention. In this invention, x preferably has a value of less than about 5, and more preferably between about 0.5 and about 5. Even more preferably, x is less than about 2.5, and more preferably is within the range between about 1 and about 2.

Commercially available alkyl polyglycosides may contain a blend of carbon lengths. Suitable alkyl polyglycosides include alkyl polyglycosides containing short chain carbons, such as chain lengths of less than $C_{16}$. In one example, suitable alkyl polyglycosides include $C_8$-$C_{16}$ alkyl polyglycosides. Additional description of suitable alkyl polyglycosides are set forth, for example, in U.S. Pat. Nos. 8,287,659 and 8,299,009, and U.S. patent application Ser. Nos. 12/819,667, 12/884,638, 12/887,716, 13/597,380, 13/622,392, and 13/653,965, which are herein incorporated by reference in their entirety.

Exemplary saccharides from which G is derived are glucose, fructose, mannose, galactose, talose, gulose, allose, altrose, idose, arabinose, xylose, lyxose and ribose. Because of the ready availability of glucose, glucose is preferred in the making of polyglycosides. The fatty aliphatic group, which is the substituent of the preferred polyglycoside, is preferably saturated, although unsaturated fatty group may be used.

Preferably the APGs have an average degree of polymerization of saccharides from 1.4 to 1.7 and the chain lengths of the aliphatic groups are between $C_{8-16}$. The alkyl polyglycosides suitable for this invention will be described as illustrated in the following way: "$C_{8-16}$ G 1.6" denotes a polyglycoside with an alkyl chain of 8 to 16 carbon atoms and an average degree of polymerization of 1.6 anhydroglucose units in the alkyl polyglucoside molecule. Commercially, alkyl polyglycosides can be provided as concentrated, aqueous solutions ranging from 50 to 70 wt. % active. Examples of commercial suppliers of alkyl polyglycosides are Dow, BASF, Seppic, Akzo Nobel, and Croda.

A preferred natural fatty alcohol based alkyl polyglycoside is C8-C16 alkyl polyglycoside commercially available as Glucopon® 425N (BASF Company), which is characterized by a degree of polymerization of 1.6 and is based on a natural fatty alcohol with a carbon chain between 8 and 16 carbon atoms.

In a preferred embodiment the alkyl polyglycoside is in an amount between about 0.05 wt. % and about 10 wt. %, more preferably in an amount between about 0.1 wt. % and about 5 wt. %, most preferably between about 0.2 wt. % and about 1 wt. %.

In a preferred embodiment of the invention the compositions are substantially free of functionalized alkyl polyglucosides, including, for example, quaternary functionalized alkyl polyglucosides.

Surfactant System

The cleaning composition contains a nonionic surfactant system comprising at least two nonionic surfactants and/or nonionic surfactant blends. The nonionic surfactant system can be in an amount between about 0.1 wt. % and about 15 wt. %, preferably between about 0.5 wt. % to about 12 wt. %, more preferably between about 2 wt. % and about 10 wt. % of the composition.

Nonionic surfactants that can be used in the composition include polyalkylene oxide surfactants (also known as polyoxyalkylene surfactants or polyalkylene glycol surfactants). Suitable polyalkylene oxide surfactants include polyoxypropylene surfactants and polyoxyethylene glycol surfactants. Suitable surfactants of this type are synthetic organic polyoxypropylene (PO)-polyoxyethylene (EO) block copolymers. These surfactants include a di-block polymer comprising an EO block and a PO block, a center block of polyoxypropylene units (PO), and having blocks of polyoxyethylene grafted onto the polyoxypropylene unit or a center block of EO with attached PO blocks. Further, this surfactant can have further blocks of either polyoxyethylene or polyoxypropylene in the molecules. A suitable average molecular weight range of useful surfactants can be about 1,000 to about 40,000 and the weight percent content of ethylene oxide can be about 10-80 wt %.

Additional nonionic surfactants include alcohol alkoxylates. A suitable alcohol alkoxylate including linear alcohol ethoxylates and/or branched alcohol ethoxylates. Branched alcohol ethoxylates can be based on secondary and tertiary alcohols. Preferably alcohol alkoxylates have a carbon chain length of between 1 and 20 carbons or can be a blend of alcohol alkoxylates having carbon chain lengths between 1 and 20 carbons, and between 2 and 20 EO groups. Preferably the alcohol alkoxylate has between 4 and 10 EO groups.

Preferred linear alcohol ethoxylates include those under the tradenames Tomadol™ and Tomakleen™, which are available from Air Products. Preferred branched alcohol ethoxylates include those under the Tergitol tradename, such as, Tergitol 15-S-7 or Tergitol 15-S-9, available from Dow Chemical. Additional alcohol alkoxylates that can be suitable for the compositions of the invention, include, but are not limited to, alkyl phenol ethoxylates, castor oil ethoxylates, alkylamine ethoxylates, tallow amine ethoxylates, fatty acid ethoxylates, sorbital oleate ethoxylates, end-capped ethoxylates, or mixtures thereof. Additional nonionic surfactants include amides such as fatty alkanolamides, alkyldiethanolamides, coconut diethanolamide, lauric diethanolamide, polyethylene glycol cocoamide (e.g., PEG-6 cocoamide), oleic diethanolamide, or mixtures thereof. Additional suitable nonionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucosides, or mixtures thereof.

In a preferred embodiment, the nonionic surfactant system comprises at least one linear alcohol ethoxylate having a carbon chain length between 9 and 12 and between 4 and 7 moles of ethoxylate, preferably about 6 moles of ethoxylate. More preferably, a linear alcohol ethoxylate blend where at least 70% of the linear alcohol ethoxylates have a carbon chain length of 9, preferably at least 80% of the linear alcohol ethoxylates have a chain length of 9, more preferably at least 90% of the linear alcohol ethoxylates have a chain length of 9 in the blend. In a more preferred embodiment, the surfactant system comprises a linear alcohol ethoxylate has a carbon chain length between 9 and 12, and a secondary alcohol ethoxylate.

Water

The cleaning composition also includes water. It should be appreciated that the water may be provided as deionized water or as softened water. The water provided in the compositions can be relatively free of hardness. It is expected that the water can be deionized to remove a portion of the dissolved solids. That is, the compositions can be formulated with water that includes dissolved solids, and can be formulated with water that can be characterized as hard water.

The water can comprise between 50 wt. % to about 98 wt. %, preferably from about 60 wt. % to about 97 wt. %, and more preferably from about 70 wt. % to about 95 wt. %.

In a preferred embodiment, the compositions are substantially free of APEs. APE-free refers to a composition, mixture, or ingredients to which APEs are not added. Should APEs be present through contamination of an APE-free composition, mixture, or ingredient, the level of APEs in the resulting composition is less than approximately 0.5 wt. %, less than approximately 0.1 wt %, and often less than approximately 0.01 wt. %.

In a preferred embodiment, the compositions are substantially free of butyl cellosolve. Should butyl cellosolve be present through contamination, the level of butyl cellosolve in the resulting composition is less than approximately 0.5 wt. %, less than approximately 0.1 wt %, and often less than approximately 0.01 wt. %.

Additional Functional Materials

The cleaning compositions can include additional components or agents, such as additional functional materials. As such, in some embodiments, the cleaning composition including the non-functionalized alkyl polyglucoside may provide a large amount, or even all of the total weight of the cleaning composition, for example, in embodiments having few or no additional functional materials disposed therein. The functional materials provide desired properties and functionalities to the cleaning composition. For the purpose of this application, the term "functional materials" include a material that when dispersed or dissolved in the compositions and provides a beneficial property in a particular use. Some particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Acid Source

The compositions of the invention may optionally include an acid source. The acid source functions to neutralize the water conditioning agent. Generally, any acid may be used in the composition, but inorganic acids are preferred. Organic acids useful in accordance with the invention include hydroxyacetic (glycolic) acid, citric acid, tartaric acid, lactic acid, ascorbic acid, gallic acid, formic acid, acetic acid, propionic acid, butyric acid, valeric acid, caproic acid, gluconic acid, itaconic acid, trichloroacetic acid, urea sulfate, and benzoic acid, among others. Organic dicarboxylic acids such as oxalic acid, malonic acid, succinic acid, glutaric acid, maleic acid, fumaric acid, adipic acid, and terephthalic acid among others are also useful in accordance with the invention. Any combination of these organic acids may also be used intermixed or with other organic acids which allow adequate formation of the hard surface cleaner composition of the invention. Inorganic acids or mineral acids useful in accordance with the invention and are preferred, these include phosphoric acid, sulfuric acid, sulfamic acid, methylsulfamic acid, hydrochloric acid, hydrobromic acid, hydrofluoric acid, and nitric acid among others. These acids may also be used in combination with other inorganic acids or with those organic acids mentioned above. An acid generator may also be used in the composition to form a suitable acid. For example, suitable generators include calcium phosphate, potassium fluoride, sodium fluoride, lithium fluoride, ammonium fluoride, ammonium bifluoride, sodium silicofluoride, etc. In accordance with the preferred embodiment of the present invention the acid is preferably selected from the group consisting of citric, tartaric, lactic, ascorbic, gallic, and glycolic acid.

Adjuvants

The present composition can also include any number of adjuvants. Specifically, the cleaning composition can include stabilizing agents, wetting agents, thickeners, foaming agents, corrosion inhibitors, biocides, hydrogen peroxide, pigments or dyes among any number of other constituents which can be added to the composition. Such adjuvants can be pre-formulated with the present composition or added to the system simultaneously, or even after, the addition of the present composition. The cleaning composition can also contain any number of other constituents as necessitated by the application, which are known and which can facilitate the activity of the present compositions.

Alkalinity Source

The cleaning compositions can include an effective amount of one or more alkalinity sources. An effective amount of one or more alkaline sources should be considered as an amount that provides a composition having a pH between about 6 and about 11. Preferably, the compositions have a pH between about 6.5 and 10.5, more preferably between about 7 and 10.

Examples of suitable alkaline sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

In general, alkalinity sources are commonly available in either aqueous or powdered form, either of which is useful in formulating the cleaning compositions. The alkalinity may be added to the composition in any form known in the art, including as solid beads, granulated or particulate form, dissolved in an aqueous solution, or a combination thereof.

In embodiments containing an alkalinity source, it is expected that the compositions will include the alkalinity source in an amount between about 0.01 wt. % and about 5 wt. %; more preferably between about 0.05 wt. % and about 2.5 wt. %; most preferably between about 0.1 wt. % and about 1 wt. %.

Antiredeposition Agents

The cleaning composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. When the compositions include an anti-redeposition agent, the anti-redeposition agent can be included in an amount of between about 0.5 wt % and about 10 wt % and between about 1 wt % and about 5 wt %.

Bleaching Agents

The cleaning composition may also include bleaching agents for lightening or whitening a substrate. Examples of suitable bleaching agents include bleaching compounds capable of liberating an active halogen species, such as $Cl_2$, $Br_2$, —$OCl^-$ and/or —$OBr^-$, under conditions typically encountered during the cleansing process. Suitable bleaching agents for use in the present cleaning compositions include, for example, chlorine-containing compounds such as a chlorine, a hypochlorite, and chloramine. Exemplary halogen-releasing compounds include the alkali metal dichloroisocyanurates, chlorinated trisodium phosphate, the alkali metal hypochlorites, monochloramine and dichloramine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein for all purposes). A bleaching agent may also be a peroxygen or active oxygen source such as hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. The composition can include an effective amount of a bleaching agent. When the compositions include a bleaching agent, it can be included in an amount of about 0.1 wt. % to about 60 wt. %, about 1 wt. % to about 20 wt. %, about 3 wt. % to about 8 wt. %, and about 3 wt. % to about 6 wt. %.

Defoaming Agents

The cleaning composition can include a defoaming agent to reduce the stability of foam and reduce foaming. When the composition includes a defoaming agent, the defoaming agent can be provided in an amount of between about 0.01 wt. % and about 3 wt. %.

Examples of defoaming agents that can be used in the composition includes ethylene oxide/propylene oxide block copolymers such as those available under the name Pluronic N3, silicone compounds such as silica dispersed in polydimethylsiloxane, polydimethylsiloxane, and functionalized polydimethylsiloxane such as those available under the name Abil B9952, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein for all purposes.

Detergent Fillers

The cleaning composition can include an effective amount of detergent fillers, which does not perform as a cleaning agent per se, but cooperates with the cleaning agent to enhance the overall cleaning capacity of the composition. Examples of detergent fillers suitable for use in the present cleaning compositions include sodium sulfate, sodium chloride, starch, sugars, $C_1$-$C_{10}$ alkylene glycols such as propylene glycol, and the like. When the compositions include a detergent filler, it can be included in an amount of between about 1 wt % and about 20 wt % and between about 3 wt % and about 15 wt %.

Dispersants

Dispersants that can be used in the cleaning composition include maleic acid/olefin copolymers, polyacrylic acid, and its copolymers, and mixtures thereof. The compositions need not include a dispersant, but when a dispersant is included it can be included in an amount that provides the desired dispersant properties. Exemplary ranges of the dispersant in the compositions can be up to about 20 wt. %, between about 0.5 wt. % and about 15 wt. %, and between about 2 wt. % and about 9 wt. %.

Dyes and Fragrances

Various dyes, odorants including perfumes, and other aesthetic enhancing agents may also be included in the cleaning composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (BASF), Pylakor Acid Bright Red (Pylam), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Hydrotropes

The compositions of the invention may optionally include a hydrotrope that aides in compositional stability and aqueous formulation. Functionally speaking, the suitable hydrotrope couplers which can be employed are non-toxic and retain the active ingredients in aqueous solution throughout the temperature range and concentration to which a concentrate or any use solution is exposed.

Any hydrotrope coupler may be used provided it does not react with the other components of the composition or negatively affect the performance properties of the composition. Representative classes of hydrotropic coupling agents or solubilizers which can be employed include anionic surfactants such as alkyl sulfates and alkane sulfonates, linear alkyl benzene or naphthalene sulfonates, secondary alkane sulfonates, alkyl ether sulfates or sulfonates, alkyl phosphates or phosphonates, dialkyl sulfosuccinic acid esters, sugar esters (e.g., sorbitan esters), amine oxides (mono-, di-, or tri-alkyl) and $C_8$-$C_{10}$ alkyl glucosides. Preferred coupling agents for use in the present invention include n-octanesulfonate, available as NAS 8D from Ecolab Inc., n-octyl dimethylamine oxide, and the commonly available aromatic sulfonates such as the alkyl benzene sulfonates (e.g. xylene sulfonates) or naphthalene sulfonates, aryl or alkaryl phosphate esters or their alkoxylated analogues having 1 to about 40 ethylene, propylene or butylene oxide units or mixtures thereof. Other preferred hydrotropes include nonionic surfactants of $C_6$-$C_{24}$ alcohol alkoxylates (alkoxylate means ethoxylates, propoxylates, butoxylates, and co- or -terpolymer mixtures thereof) (preferably $C_6$-$C_{14}$ alcohol alkoxylates) having 1 to about 15 alkylene oxide groups (preferably about 4 to about 10 alkylene oxide groups); $C_6$-$C_{24}$ alkylphenol alkoxylates (preferably $C_8$-$C_{10}$ alkylphenol alkoxylates) having 1 to about 15 alkylene oxide groups (preferably about 4 to about 10 alkylene oxide groups); $C_6$-$C_{24}$ alkylpolyglycosides (preferably $C_6$-$C_{20}$ alkylpolyglycosides) having 1 to about 15 glycoside groups (preferably about 4 to about 10 glycoside groups); $C_6$-$C_{24}$ fatty acid ester ethoxylates, propoxylates or glycerides; and $C_4$-$C_{12}$ mono or dialkanolamides. A preferred hydrotope is sodium xylenesulfonate (SXS).

The composition of an optional hydrotrope can be present in the range of from about 0 to about 25 percent by weight.

In an aspect of the invention, the hydrotrope can serve as a coupling agent. Preferably the hydrotrope is present in an amount between about 0.1 wt. % and about 10 wt. % of the composition; more preferably from about 0.5 wt. % to about 7 wt. %; most preferably from about 0.8 wt. % to about 5 wt. %.

Solvent

The compositions of the invention may optionally include a solvent. A solvent is often times useful in cleaning compositions to enhance soil removal properties. The cleaning compositions of the invention may include a solvent to adjust the viscosity of the final composition. The intended final use of the composition may determine whether or not a solvent is included in the cleaning composition. In some embodiments including a solvent, the solvent can be a low cost solvent such as isopropyl alcohol or benzyl alcohol. A solvent may or may not be included to improve soil removal, handleability or ease of use of the compositions of the invention. Suitable solvents useful in removing hydrophobic soils include, but are not limited to: a lower alkanol, a lower alkyl ether, a glycol, an aryl glycol ether, a lower alkyl glycol ether, a glycerol ketal, an ester, a hydrocarbon/ester blend, a dibasic ester, and combinations thereof. Examples of other solvents include, but are not limited to: methanol, ethanol, propanol, isopropanol and butanol, isobutanol, ethylene glycol, diethylene glycol, triethylene glycol, propylene glycol, dipropylene glycol, mixed ethylene-propylene glycol ethers, ethylene glycol phenyl ether, and propylene glycol phenyl ether. Substantially water soluble glycol ether solvents include, not are not limited to: propylene glycol methyl ether, propylene glycol propyl ether, dipropylene glycol methyl ether, tripropylene glycol butyl ether, tripropylene glycol methyl ether, ethylene glycol butyl ether, diethylene glycol methyl ether, diethylene glycol butyl ether, ethylene glycol dimethyl ether, ethylene glycol propyl ether, diethylene glycol ethyl ether, triethylene glycol methyl ether, triethylene glycol ethyl ether, triethylene glycol butyl ether and the like.

Exemplary preferred solvents include, but are not limited to, Elevance 1000 and Elevance 1200 (hydrocarbon/esters blends) available from Elevance, Farnesene available from Sigma, Ethyl Laurate (an ester) available from Aldridge, Omnia (an ester alcohol) available from Eastman, TPnB (a glycol ether) available from Dow, SV 218 and SV 388 (glycerol ketals) available from Segetis, Rhodiasolv® Iris (a dibasic methyl ester) available from Solvay, Augeo™ Clean Plus (a 4-hydroxymethyl-2-isobutyl-2-methyl-1,3-dioxolane) and Augeo™ Clean Multi (a di-isopropylene glycerol) available from Solvay, benzyl alcohol, and glycerol ethers.

The solvent can comprise between about 0.1 wt. % and about 15 wt. %, preferably between about 0.3 wt. % and about 10 wt. %, and more preferably between about 0.5 wt. % and about 5 wt. %.

In an aspect of the invention, the compositions can be substantially free of butyl cellosolve, having less than about 1 wt. % butyl cellosolve, preferably less than about 0.5 wt. % butyl cellosolve, more preferably less than about 0.1 wt. % butyl cellosolve, and most preferably less than about 0.05 wt. % butyl cellosolve.

Stabilizing Agents

Stabilizing agents that can be used in the cleaning composition include, but are not limited to: primary aliphatic amines, betaines, borate, calcium ions, sodium citrate, citric acid, sodium formate, glycerine, malonic acid, organic diacids, polyols, propylene glycol, and mixtures thereof. The compositions need not include a stabilizing agent, but when the compositions include a stabilizing agent, it can be included in an amount that provides the desired level of stability of the concentrate. Exemplary ranges of the stabilizing agent include up to about 20 wt %, between about 0.5 wt. % to about 15 wt. % and between about 2 wt. % to about 10 wt. %. A preferred stabilizing agent is sodium citrate.

In an embodiment of the cleaning composition, the amount of stabilizing agent is preferably between about 0.01 wt. % and about 5 wt. %; more preferably between about 0.05 wt. % and about 2.5 wt. %; most preferably between about 0.1 wt. % and about 1 wt. %.

Surfactants

In some embodiments, the compositions of the present invention include an additional surfactant. Additional surfactants can include, but are not limited to, nonionic surfactants, semipolar nonionic surfactants, cationic surfactants, amphoteric surfactants, and zwitterionic surfactants. In an aspect of the invention, the hard surface cleaner compositions are free or substantially free of anionic surfactants. In some embodiments, the compositions of the present invention include about 0.01 wt. % to about 40 wt. % of a surfactant. In other embodiments the compositions of the present invention include about 0.1 wt. % to about 35 wt. % of a surfactant. In still yet other embodiments, the compositions of the present invention include about 0.5 wt. % to about 30 wt. % of a surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Solvay and Triton® manufactured by Dow.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

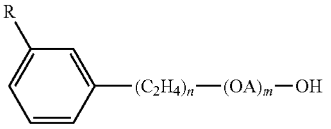

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n\ (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_xH$, where x is in the range of from 1 to 3.

13. A useful class of non-ionic surfactants includes the class defined as alkoxylated amines or, most particularly, alcohol alkoxylated/aminated/alkoxylated surfactants. These non-ionic surfactants may be at least in part represented by the general formulae: $R^{20}-(PO)_SN-(EO)_tH$, $R^{20}-(PO)_SN-(EO)_tH(EO)_tH$, and $R^{20}-N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)_V-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in “Surface Active Agents and detergents” (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

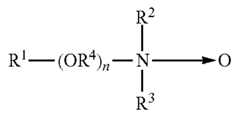

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

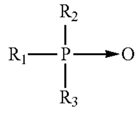

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

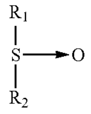

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

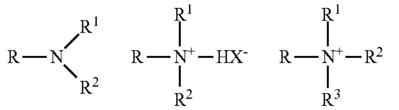

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

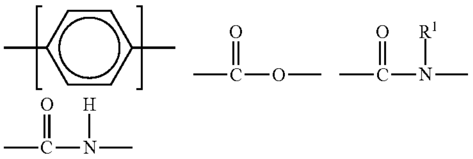

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

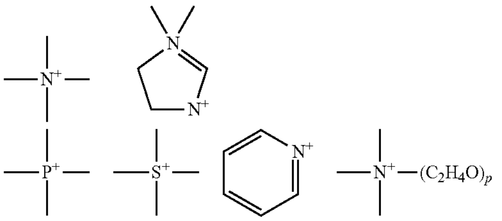

p = about 1 to 12

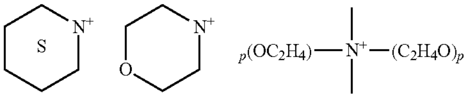

p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

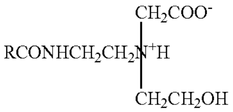

(MONO)ACETATE
Neutral pH Zwitterion

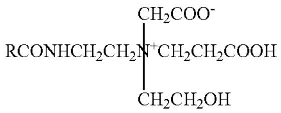

(DI)PROPIONATE

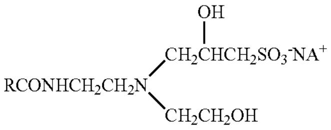

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8\text{-}C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+(CH_2$—$CH_2$—$CO_2Na)_2$—$CH_2$—$CH_2$—OH or $C_{12}$-alkyl-C(O)—N(H)—$CH_2$—$CH_2$—$N^+(CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

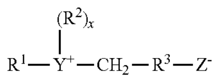

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

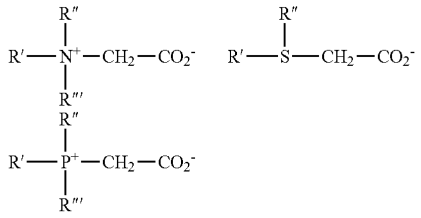

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

Thickening Agents

The viscosity of the cleaning composition increases with the amount of thickening agent, and viscous compositions are useful for uses where the cleaning composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, the viscosity of thickener within the present composition ranges from about 0.1 wt. % to about 3 wt. %, from about 0.1 wt. % to about 2 wt. %, or about 0.1 wt. % to about 0.5 wt. %.

Water Conditioning Agent

The compositions of the invention can include a water conditioning agent. The compositions can include between about 0.5 wt. % and about 15 wt. % water conditioning agent. In an embodiment of the compositions the water conditioning agent is from about 1 wt. % to about 12 wt. %, more preferably between about 2 wt. % and about 10 wt.

The water conditioning agent aids in removing metal compounds and in reducing harmful effects of hardness components in service water. Exemplary water conditioning agents include chelating agents, sequestering agents and inhibitors. In embodiments of the invention, the compositions can include more than one water conditioning agents.

Polyvalent metal cations or compounds such as a calcium, a magnesium, an iron, a manganese, a molybdenum, etc. cation or compound, or mixtures thereof, can be present in service water and in complex soils. Such compounds or cations can interfere with the effectiveness of a washing or rinsing compositions during a cleaning application. A water conditioning agent can effectively complex and remove such compounds or cations from soiled surfaces and can reduce or eliminate the inappropriate interaction with active ingredients of the invention.

Both organic and inorganic water conditioning agents are common and can be used. Inorganic water conditioning agents include such compounds as sodium tripolyphosphate and other higher linear and cyclic polyphosphates species.

Organic water conditioning agents include both polymeric and small molecule water conditioning agents. Organic small molecule water conditioning agents are typically organocarboxylate compounds or organophosphate water conditioning agents. Polymeric inhibitors commonly comprise polyanionic compositions such as polyacrylic acid compounds.

Small molecule organic water conditioning agents include, but are not limited to: sodium gluconate, sodium glucoheptonate, aminocarboxylates, and iminodisuccinate sodium salt (IDS). Preferred aminocarboxylates include N-hydroxyethylenediaminetriacetic acid (HEDTA), ethylenediaminetetraacetic acid (EDTA), nitrilotriacetic acid (NTA), diethylenetriaminepentaacetic acid (DTPA), ethylenediaminetetraproprionic acid, triethylenetetraaminehexaacetic acid (TTHA), and the respective alkali metal, ammonium and substituted ammonium salts thereof, ethylenediaminetetraacetic acid tetrasodium salt (EDTA), nitrilotriacetic acid trisodium salt (NTA), ethanoldiglycine disodium salt (EDG), diethanolglycine sodium-salt (DEG), and 1,3-propylenediaminetetraacetic acid (PDTA), dicarboxymethyl glutamic acid tetrasodium salt (GLDA), and methylglycine-N—N-diacetic acid trisodium salt (MGDA).

Embodiments of the Present Compositions

The cleaning composition of the present invention is effective at removing both food soil containing protein and industrial hydrocarbon based oily soils. Exemplary compositions of the invention are provided in Table 1.

TABLE 1

| Component | First Range (Wt. %) | Second Range (Wt. %) | Third Range (Wt. %) |
|---|---|---|---|
| Water | 70-99 | 80-98 | 85-95 |
| Alkyl Polyglycoside | 0.05-10 | 0.1-5 | 0.2-1 |
| Nonionic Surfactant System | 0.1-15 | 0.5-12 | 2-10 |
| Optional Alkalinity Source | 0.01-5 | 0.05-2.5 | 0.1-1 |
| Optional Hydrotrope | 0.1-10 | 0.5-7 | 0.8-5 |
| Optional Solvent | 0.1-15 | 0.3-10 | 0.5-5 |
| Optional Stablizing Agent | 0.01-5 | 0.05-2.5 | 0.1-1 |
| Optional Water Conditioning Agent | 0.5-8 | 1-5 | 1.5-3 |

The compositions of the invention can be prepared as concentrates and/or ready-to-use solutions. The concentrate composition of the present invention can be provided as a solid, liquid, or gel, or a combination thereof. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided as a capsule or pellet of compressed powder, a solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms "capsule" and "pellet" are used for exemplary purposes and are not intended to limit the delivery mode of the invention to a particular shape.

When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning. When the cleaning composition is provided as a solid, the compositions provided herein may be altered in a manner to solidify the cleaning composition by any means known in the art. For example, the amount of water may be reduced or additional ingredients may be added to the cleaning composition, such as a solidification agent.

In another embodiment, the solid concentrate composition can be diluted through dispensing equipment whereby water is sprayed at the solid block forming the use solution. The water flow is delivered at a relatively constant rate using mechanical, electrical, or hydraulic controls and the like. The solid concentrate composition can also be diluted through dispensing equipment whereby water flows around the solid block, creating a use solution as the solid concentrate dissolves. The solid concentrate composition can also be diluted through pellet, tablet, powder and paste dispensers, and the like.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

It is expected that the concentrate will be diluted with the water of dilution in order to provide a use solution having a desired level of detersive properties. If the use solution is required to remove tough or heavy soils, it is expected that the concentrate can be diluted with the water of dilution at a weight ratio of at least 1:1 and up to 1:8. If a light duty cleaning use solution is desired, it is expected that the concentrate can be diluted at a weight ratio of concentrate to water of dilution of up to about 1:256.

In an alternate embodiment, the cleaning compositions may be provided as a ready-to-use (RTU) composition. If the cleaning composition is provided as a RTU composition, a more significant amount of water is added to the cleaning composition as a diluent. When the concentrate is provided as a liquid, it may be desirable to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little water as possible in order to reduce transportation costs, it is also desirable to provide a concentrate that can be dispensed accurately. In the case of a liquid concentrate, it is expected that water will be present in an amount of up to about 90 wt. %, particularly between about 20 wt. % and about 85 wt. %, more particularly between about 30 wt. % and about 80 wt. % and most particularly between about 50 wt. % and about 80 wt. %.

In the case of a RTU composition, it should be noted that the above-disclosed cleaning composition may, if desired, be further diluted with up to about 96 wt. % water, based on the weight of the cleaning composition.

Compositions of the invention may be useful to clean a variety of surfaces. Invention compositions may be used to clean soils on hard surfaces including but not limited to ceramics, ceramic tile, grout, granite, concrete, mirrors, enameled surfaces, metals including aluminum, brass, stainless steel and the like. Compositions of the invention may also be used to clean soiled linens such as towels, sheets, and nonwoven webs. As such, compositions of the invention are useful to formulate hard surface cleaners, laundry detergents, oven cleaners, automotive detergents, manual dishwashing, and ware washing detergents whether automatic or manual.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Materials Used:

- Glucopon® 425N: a non-functionalized alkyl polyglycoside, based on a C8-C16 natural fatty alcohol, available from BASF.
- Omnia™: butyl-3-hydroxybutyrate, which is a biodegradable, low-VOC solvent available from Eastman.
- Segetis™ SV218: a bio-sourced, non-VOC, non-flammable solvent.
- Tergitol™ 15 S 9: a nonionic secondary alcohol ethoxylate available from DOW Chemical.
- Tomadol® 901: a nonionic linear alcohol ethoxylate surfactant or surfactant blend available from Air Products.
- Tomakleen® G-12: a nonionic surfactant blend containing linear alcohol ethoxylates available from Air Products.
- Commercially available tetrasodium EDTA, sodium xylene sulfonate, sodium carbonate, tripropylene glycol butyl ether, benzyl alcohol, a $C_4$ methyl ester.

Example 1

Red and Black Soil Removal Test

A food soil containing protein was prepared from lard, oil, protein, and iron (III) oxide (for color) (an exemplary proteinaceous food soil referred to as "red soil" throughout the Examples). About 30 grams of lard was combined with about 30 grams of corn oil, about 15 grams of whole powdered egg, and about 1.5 grams of $Fe_2O_3$.

An exemplary industrial hydrocarbon-based oily soil (referred to as "black soil" throughout the Examples) was prepared with about 50 grams mineral spirits, about 5 grams mineral oil, about 5 grams motor oil, about 2.5 grams black pigment dispersion and about 37.5 grams bandy black clay was prepared.

Tiles soiled with red soil were prepared and tiles soiled with black soil were also prepared. The back, grooved sides of a plurality of 3"×3" white vinyl tiles were soiled with approximately 0.75 grams of the soils using a 3" foam brush. The tiles were allowed to dry at room temperature overnight. For the red soil, it is believed that this incubation period allowed the bonds holding the triglycerides and proteins together in the soil to begin to crystallize and interlink. The next day, the tiles were placed into a soaking tray containing about 200 grams of a test composition for about 1 minute for red soil and about 2 minutes for black soil.

The soil removal test was conducted using Gardco Washability Test Equipment Model D10V available from Paul N. Gardner Company Inc., using a synthetic sponge. The dry synthetic sponge was saturated with about 80 grams of the test compositions. The tiles were then placed into the Gardco with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360 degree rotation of the tiles for red soil and 40 cycles, rotating the tiles 90 degrees every 10 cycles for a complete 360 degree rotation of the tiles for black soil. The tiles were then rinsed with city water and dried overnight at room temperature. Hunter Lab L* reflectance washed tiles were measured. An exemplary use solution of the compositions of the invention was prepared, with 1% active linear ethoxylate nonionic surfactant. Additionally, a similar use solution including 4% active butyl ether was prepared as a control. The two compositions were prepared according to Table 2 in a 1000 mL beaker and dissolved in an appropriate amount of 5 grain water.

TABLE 2

| Ingredients | Composition A | Control Composition |
|---|---|---|
| Sodium Citrate | 25 grams | 25 grams |
| Sodium Carbonate | 5 grams | 5 grams |
| Tomadol 901 | 10 grams | 10 grams |
| C9-C11 linear alcohol ethoxylate | 10 grams | 0 grams |
| Butyl ether | 0 grams | 40 grams |

Tiles were soiled according to the procedures described above in Example 1 for the red soil. Similarly, a plurality of 3"×3" white vinyl tiles were soiled on the back, grooved side with approximately 0.75 grams of the black test soil using a 3" foam brush. The tiles were allowed to dry at room temperature overnight. The next day, the tiles were placed into a soaking tray containing about 200 grams of the cleaning composition for about 1 minute for red soil and about 2 minutes for black soil. The soil removal test was conducted using Gardco Washability Test Equipment Model D10V and a synthetic sponge. The dry sponge was saturated with about 80 grams of the test compositions.

Both the tiles soiled with red soil and black soil were then placed into a Gardco with the grain of the tiles parallel to the direction of sponge travel. The black soil tiles were then scrubbed with about 2 pounds of pressure with the moistened synthetic sponge for 40 cycles, rotating the tiles 90 degrees every 10 cycles for a complete 360 degree rotation of the tiles. The red soiled tiles were scrubbed with about 2 pounds of pressure with the moistened synthetic sponge for 16 cycles, rotating the tiles 90 degrees every 4 cycles for a complete 360 degree rotation of the tiles. Both sets of tiles were then rinsed with city water and dried overnight at room temperature. Hunter Lab L* reflectance of the washed tiles were measured. The L* reflectance values are summarized in FIGS. 1-4. A higher reflectance value indicates better cleaning efficacy.

FIG. 1 shows a graph comparing the red soil cleaning efficacy of an exemplary cleaning composition of the invention versus an equivalent butyl cellosolve-containing cleaning composition (prior to recent regulatory limitations on butyl cellosolve-containing cleaning compositions, such compositions have been one of the standard formulations for hard surface cleaning efficacy) and a control of 5 grain water. The graph shows that the formula of the invention provides better cleaning efficacy to the equivalent butyl cellosolve-based cleaning composition, illustrating the suitability of the formulations of the invention for providing effective removal of proteinaceous food soils.

Figure 2:
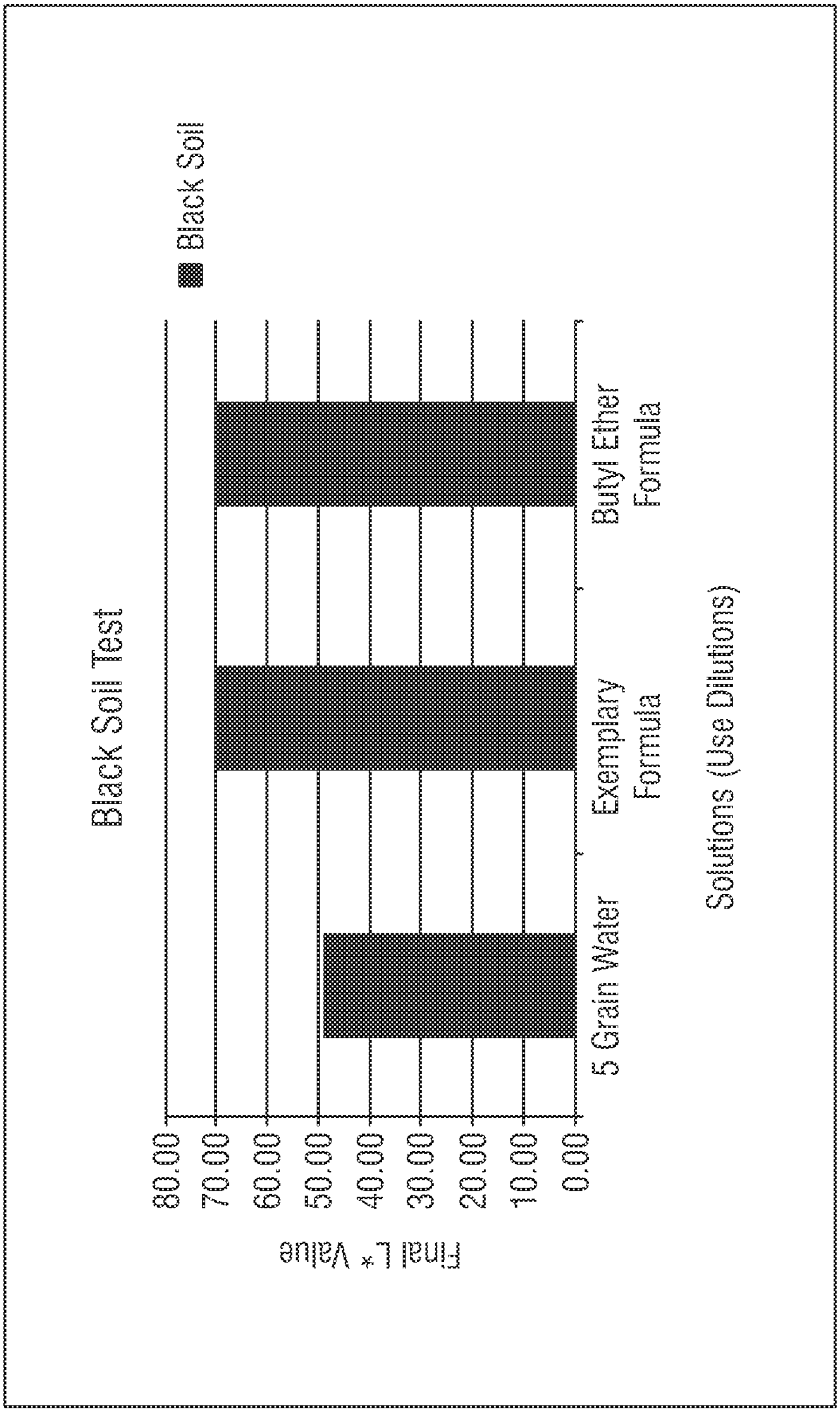
FIG. 2 is a graph showing the hydrocarbon-based oily soil cleaning efficacy of an exemplary cleaning composition of the invention versus an equivalent butyl cellosolve-containing cleaning composition and a control of 5 grain water.

FIG. 2 shows a graph comparing the black soil cleaning efficacy of an exemplary cleaning composition of the invention versus an equivalent butyl cellosolve-containing cleaning composition and a control of 5 grain water. The graph shows that the formula of the invention provides substantially similar cleaning efficacy to the equivalent butyl cellosolve-based cleaning composition and better cleaning efficacy than just water, illustrating the suitability of the formulations of the invention for providing an effective removal of hydrocarbon-based oily soils.

Example 2

Comparison with NPE-Containing Compositions

Red and black soils were prepared again according to the procedures set forth in Example 1. Exemplary use solutions of cleaning compositions were prepared as set forth in Tables 2A and 2B. A control use solution was prepared with Super Excellent at a dilution of 8 oz per gallon (6.25% active). Another control was 5 grain water.

TABLE 2A

| Ingredients | Formulas (wt. %) | | | | |
|---|---|---|---|---|---|
| | A | B | C | D | E |
| Water | 92.7 | 93.4 | 90.6 | 92.2 | 94.1 |
| Secondary alcohol ethoxylate | 0.51 | 0.51 | 0.50 | 0.51 | 0.52 |
| Sodium Citrate | 0.20 | 0.21 | 0.20 | 0.20 | 0.21 |
| Glucopon 425N | 0.51 | 0.51 | 0.50 | 0.51 | 0.52 |
| Omnia | 3.1 | 0 | 0 | 0 | 0 |
| Tripropylene glycol butyl ether | 0 | 3.1 | 0 | 0 | 0 |
| Benzyl alcohol | 0 | 0 | 3.0 | 0 | 0 |
| Rhodiasolv ® Iris | 0 | 0 | 0 | 2.5 | 0 |
| C9-C11 linear alcohol ethoxylate | 0 | 0 | 0 | 0 | 3.1 |
| Sodium Xylene Sulfonate | 1.0 | 0 | 2.8 | 2.0 | 0 |

TABLE 2B

| Ingredients | Formulas (wt. %) | | | | | |
|---|---|---|---|---|---|---|
| | F | G | H | I | J | K |
| Water | 92.9 | 93.6 | 90.8 | 91.5 | 92.4 | 94.3 |
| Sodium carbonate | 0.51 | 0.51 | 0.50 | 0.50 | 0.51 | 0.52 |
| Tomadol 901 | 0.51 | 0.51 | 0.50 | 0.50 | 0.51 | 0.52 |
| Glucopon 425N | 0.26 | 0.26 | 0.25 | 0.25 | 0.25 | 0.26 |
| $Na_4EDTA$ | 2.0 | 2.0 | 2.0 | 2.0 | 2.0 | 2.0 |
| Pearl G2 | 2.3 | 0 | 0 | 0 | 0 | 0 |
| Tripropylene glycol butyl ether | 0 | 2.3 | 0 | 0 | 0 | 0 |
| Benzyl alcohol | 0 | 0 | 2.2 | 0 | 0 | 0 |
| Segetis SV 218 | 0 | 0 | 0 | 2.3 | 0 | 0 |
| $C_4$ methyl ester | 0 | 0 | 0 | 0 | 2.3 | 0 |
| C9-C11 linear alcohol ethoxylate | 0 | 0 | 0 | 0 | 0 | 2.3 |
| Sodium xylene sulfonate | 1.5 | 0.8 | 3.7 | 3.0 | 2.0 | 0 |

The HunterLab measurements were taken for the clean tiles prior to soiling. Tiles were soiled according to the procedures described above in Example 1 for the red soil and black soil. Both the tiles soiled with red soil and black soil were then placed into a Gardco with the grain of the tiles parallel to the direction of sponge travel. The dry synthetic sponges were saturated with 80 grams of the cleaning solution and each solution was repeated once. The black soil tiles were then scrubbed with about 2 pounds of pressure with the moistened synthetic sponge for 40 cycles, rotating the tiles 90 degrees every 10 cycles for a complete 360 degree rotation of the tiles. The red soiled tiles were scrubbed with about 2 pounds of pressure with the moistened synthetic sponge for 16 cycles, rotating the tiles 90 degrees every 4 cycles for a complete 360 degree rotation of the tiles. Both sets of tiles were then rinsed with city water and dried overnight at room temperature. The final reflectance (L*) values were measured and the average percentage reflectance change of the soil removal was calculated by the equation from Example 2.

Table 3 provides the final reflectance values (L*) and the average percentage reflectance change of the black soil test data for the various formulations and controls. Table 4 provides the final reflectance values (L*) and the average percentage reflectance change of the red soil test data for the various formulations and controls. The final reflectance value (L*) data from Tables 3 and 4 is provided in FIG. 3 as a graphical representation comparing the black and red soil cleaning efficacy of the exemplary cleaning compositions of the invention versus the Super Excellent control (S.E.) and 5 grain water control. Similarly, the average percentage reflectance change data from Tables 3 and 4 is provided in FIG. 4 as a graphical representation comparing the black and red soil cleaning efficacy of the exemplary cleaning compositions of the invention versus the Super Excellent control (S.E.) and 5 grain water control.

Figure 3:
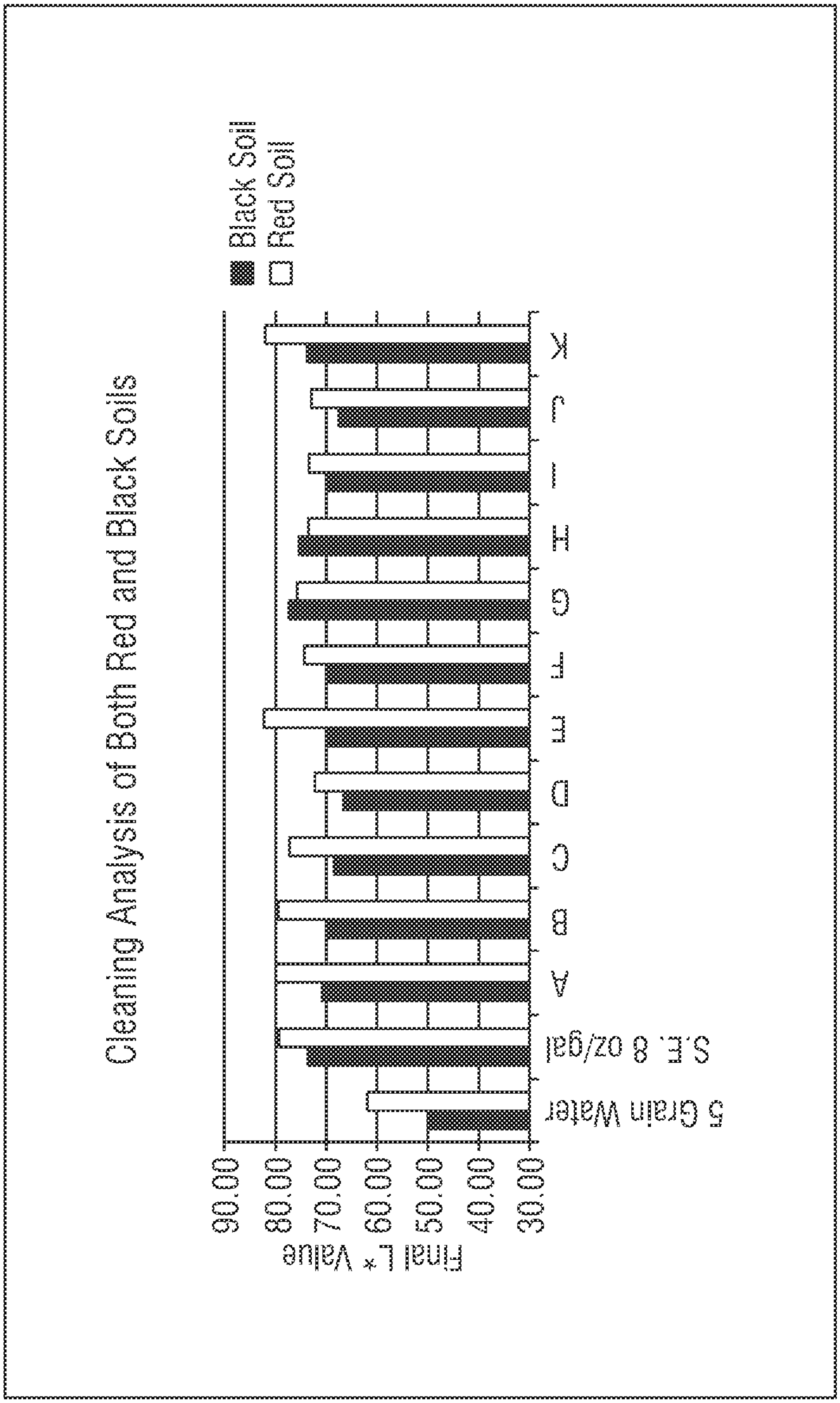
FIGS. 3 and 4 are graphs showing the cleaning efficacy of an exemplary cleaning composition of the invention versus a number of different solvent-containing compositions, a commercially available NPE-containing composition, and 5 grain water against both proteinaceous food soils and hydrocarbon-based oily soils.
Figure 4:
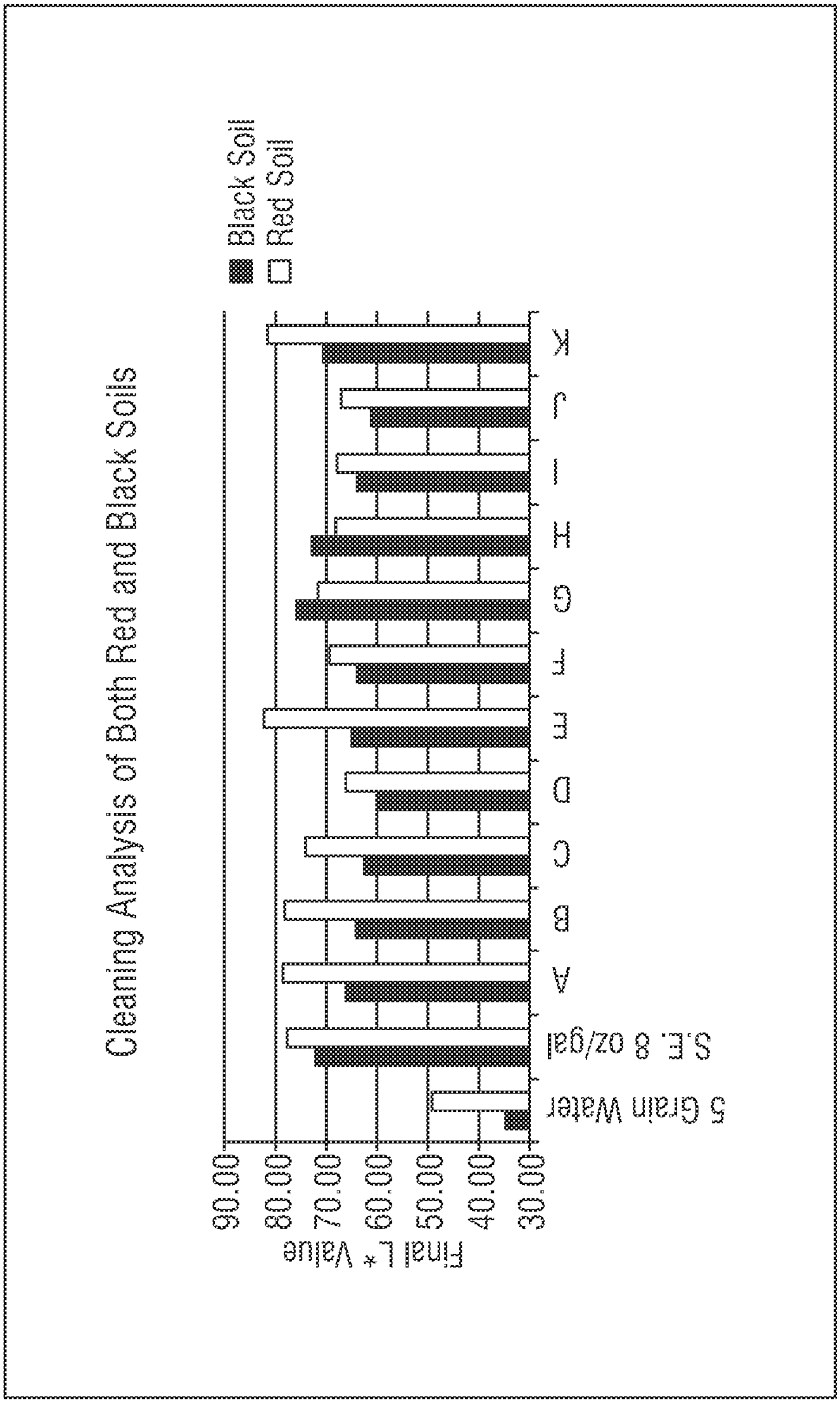

As can be seen in FIGS. 3 and 4, the exemplary formula of the invention provides better cleaning efficacy against red soil when compared to all the other tested cleaning compositions. This illustrates the suitability of the formulations of the invention for providing an effective replacement for the commercially-available butyl cellosolve-containing cleaning compositions and NPE-containing cleaning compositions for removal of red soils.

Further, as can be seen in Tables 3 and 4 and FIGS. 3 and 4, the composition of the invention provides very good cleaning efficacy against black soils, which was only minimally less effective than Super Excellent and two of the solvent containing formulas. Thus, it provides substantially similar cleaning efficacy or better cleaning efficacy than the other tested cleaning compositions for removal of black soils.

TABLE 3

| Black Soil Test Data | | | |
|---|---|---|---|
| Solution | Initial L* | Soiled L* | Cleaned (Ave) |
| A | 93.15 | 26.73 | 70.62 |
| A | 92.96 | 27.03 | 71.00 |
| B | 93.20 | 26.92 | 69.75 |
| B | 93.23 | 27.10 | 69.30 |
| C | 93.27 | 27.80 | 68.51 |
| C | 92.84 | 27.50 | 68.26 |
| D | 93.12 | 27.16 | 67.17 |
| D | 93.24 | 29.95 | 66.45 |
| E | 93.14 | 26.86 | 69.16 |
| E | 92.94 | 26.44 | 80.90 |
| F | 93.52 | 26.04 | 67.44 |
| F | 93.17 | 26.78 | 71.13 |
| G | 93.38 | 27.10 | 76.87 |
| G | 93.11 | 27.14 | 77.52 |
| H | 93.43 | 27.35 | 74.51 |
| H | 92.83 | 27.00 | 75.83 |
| I | 92.65 | 26.84 | 69.63 |
| I | 92.87 | 27.40 | 69.13 |
| J | 92.58 | 28.04 | 67.97 |
| J | 92.65 | 27.58 | 66.94 |
| K | 93.13 | 27.36 | 72.72 |

TABLE 3-continued

| Black Soil Test Data | | | |
|---|---|---|---|
| Solution | Initial L* | Soiled L* | Cleaned (Ave) |
| K | 92.73 | 26.56 | 74.33 |
| S.E. | 92.92 | 27.38 | 73.91 |
| S.E. | 93.15 | 27.53 | 75.62 |
| 5 Gr. Water | 92.70 | 26.35 | 50.40 |
| 5 Gr. Water | | | 49.97 |

TABLE 4

| Red Soil Test Data | | | |
|---|---|---|---|
| Solution | Initial L* | Soiled L* | Cleaned (Ave) |
| A | 93.15 | 32.53 | 81.36 |
| A | 92.96 | 35.20 | 78.60 |
| B | 93.20 | 34.86 | 79.63 |
| B | 93.23 | 33.68 | 79.81 |
| C | 93.27 | 32.17 | 77.37 |
| C | 92.84 | 31.23 | 72.57 |
| D | 93.12 | 28.75 | 81.85 |
| D | 93.24 | 31.23 | 72.57 |
| E | 93.14 | 28.75 | 81.85 |
| E | 92.94 | 27.68 | 82.72 |
| F | 93.52 | 35.15 | 74.88 |
| F | 93.17 | 32.84 | 73.74 |
| G | 93.38 | 30.78 | 75.21 |
| G | 93.11 | 30.39 | 76.22 |
| H | 93.43 | 31.76 | 74.65 |
| H | 92.83 | 36.03 | 72.42 |
| I | 92.65 | 30.32 | 75.57* |
| I | 92.87 | 28.63 | 71.01 |
| J | 92.58 | 28.07 | 73.69 |
| J | 92.65 | 28.44 | 72.16 |
| K | 93.13 | 29.92 | 82.88 |
| K | 92.73 | 29.50 | 80.67 |
| 5 Gr. Water | 92.92 | 29.25 | 60.98 |
| 5 Gr. Water | 93.15 | 34.48 | 62.81 |
| S.E. | 92.70 | 27.03 | 79.63 |
| S.E. | | | 79.31 |

*This measurement was not considered in the results because the tile used during the experiment did not hold the soil adequately.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A hard surface cleaning composition comprising:
an alkyl polyglycoside comprising a fatty aliphatic group with between 6 and 20 carbon atoms;
a carbonate-based alkalinity source;
a nonionic surfactant system comprising:
(a) a first nonionic surfactant comprising a linear alcohol ethoxylate, and
(b) a second nonionic surfactant; and
glycerine; wherein the composition is substantially free of butyl cellosolve.

2. The hard surface cleaning composition of claim 1 wherein said nonionic surfactant system comprises between about 0.1 wt. % and about 15 wt. %.

3. The hard surface cleaning composition of claim 1, wherein the fatty aliphatic group of the alkyl polyglycoside has between 8 and 16 carbon atoms.

4. The hard surface cleaning composition of claim 1, wherein the alkyl polyglycoside is a mixture of at least two alkyl polyglycosides.

5. The hard surface cleaning composition of claim 4, wherein each of the at least two alkyl polyglycosides has a fatty aliphatic group of between 8 and 16 carbon atoms.

6. The hard surface cleaning composition of claim 1, wherein the glycerine is in a concentration of up to 20 wt. %.

7. The hard surface cleaning composition of claim 1, further comprising a hydroxide-based alkalinity source.

8. The hard surface cleaning composition of claim 1, further comprising water.

9. The hard surface cleaning composition of claim 1, further comprising a quaternary ammonium compound.

10. A ready-to-use hard surface cleaner comprising:
a composition comprising
between about 0.05 wt. % and about 10 wt. % of an alkyl polyglycoside comprising a fatty aliphatic group with between 6 and 20 carbon atoms;
a carbonate-based alkalinity source;
between about 0.1 wt. % and about 15 wt. % of a nonionic surfactant system comprising:
(a) a first nonionic surfactant comprising a linear alcohol ethoxylate, and
(b) a second nonionic surfactant;
glycerine; and
water diluting the composition up to 96 wt. %; wherein the cleaner is substantially free of butyl cellosolve.

11. The ready-to-use hard surface cleaner of claim 10, wherein the cleaner is sprayable.

12. The ready-to-use hard surface cleaner of claim 10, wherein the fatty aliphatic group of the alkyl polyglycoside has between 8 and 16 carbon atoms.

13. The ready-to-use hard surface cleaner of claim 10, wherein the alkyl polyglycoside is a mixture of at least two alkyl polyglycosides.

14. The ready-to-use hard surface cleaner of claim 13, wherein each of the at least two alkyl polyglycosides has a fatty aliphatic group of between 8 and 16 carbon atoms.

15. The ready-to-use hard surface cleaner of claim 10, wherein the glycerine is in a concentration of between about 0.01 wt. % and about 5 wt. % of the composition.

16. The ready-to-use hard surface cleaner of claim 10, wherein the composition further comprises an alkalinity source.

17. The ready-to-use hard surface cleaner of claim 10, further comprising a quaternary ammonium compound.

18. A method of cleaning a hard surface comprising:
contacting the hard surface with the ready-to-use hard surface cleaner of claim 10.

* * * * *